United States Patent [19]
Cline et al.

[11] 3,857,066
[45] Dec. 24, 1974

[54] ELECTROSTATIC CHARGE SENSING PROBE

[75] Inventors: Jay D. Cline; Don S. Grant, both of Fort Lauderdale, Fla.

[73] Assignee: Dayton Aircraft Products, Inc., Fort Lauderdale, Fla.

[22] Filed: July 6, 1973

[21] Appl. No.: 377,060

[52] U.S. Cl. .................... 317/2 R, 317/2 E, 324/32
[51] Int. Cl. .............................................. H05f 3/06
[58] Field of Search............ 317/2 E, 4; 324/109, 32

[56] References Cited
UNITED STATES PATENTS

| | | | |
|---|---|---|---|
| 2,264,495 | 12/1941 | Wilner | 317/4 |
| 2,549,671 | 4/1951 | Dana | 317/2 E |
| 3,035,208 | 5/1962 | Clark | 317/2 E |
| 3,260,893 | 7/1966 | DeLaCierva et al. | 317/2 E |

*Primary Examiner*—J. D. Miller
*Assistant Examiner*—Harry E. Moose, Jr.
*Attorney, Agent, or Firm*—Biebel, French & Bugg

[57] ABSTRACT

An electrostatic sensing probe extends from an aircraft into the atmosphere to sense the magnitude and polarity of any electrostatic charge accumulated thereon. A high voltage sensor power supply is connected between the probe and the aircraft with the sensor power supply having an output voltage of sufficient magnitude to cause current to flow between the probe and the atmosphere. In one embodiment, a single probe is employed and is connected to an alternating current high voltage sensor power supply with current flowing in the probe during positive and/or negative half cycles. In another embodiment, two probes are used, one connected to a positive high voltage sensor power supply, the other connected to a negative high voltage sensor power supply. In both embodiments, the current through the probe or probes is sensed by an amplifier as a function of the polarity and magnitude of the electrostatic charge accumulation on the aircraft. The output of the probe current sensing amplifier controls remotely mounted positive and negative high voltage discharge power supply means which neutralize the accumulated electrostatic charge.

7 Claims, 6 Drawing Figures

Patented Dec. 24, 1974

ELECTROSTATIC CHARGE SENSING PROBE

BACKGROUND OF THE INVENTION

This invention relates to an electrostatic sensing probe for sensing the electrostatic charge accumulated on aircraft, especially helicopters.

It is well known that aircraft accumulate an electrical charge due to atmospheric conditions and to the motion of the aircraft through the atmosphere. This electrostatic charge accumulation can cause radio frequency interference and can cause electrical shock to a person touching a charged aircraft, or might cause the ignition of fuel.

General prior art systems have been proposed in which an electrostatic charge on an aircraft is detected by a sensing unit, with the output of the sensing unit being applied to control positive and negative high voltage discharge power supplies having discharge probes extending from the aircraft to discharge the accumulated charge.

The devices presently used for sensing the electrostatic buildup on an aircraft are known as field mills. These devices include a fixed plate and a rotating element to shield the fixed plate periodically from the electrostatic field. The sensitivity of the field mill to electrostatic charge depends upon the rotating vane alternately completely covering and uncovering the fixed plate. Two major problems are associated with the field mill type of sensor: noise may be generated by the motor which rotates the vane, and a rotating vane will erode due to its movement through the atmosphere, particularly when used on a helicopter where blowing dust, sand, etc., may be present, thereby decreasing the sensitivity of the device. U.S. Pat. Nos. 3,035,208; 3,260,893 and 3,427,504 are representative of the prior art systems using field mills.

U.S. Pat. No. 2,386,647 discloses an electrostatic charge system employing a fixed probe for sensing the electrostatic buildup on an aircraft. This probe, however, is insensitive to electrostatic voltages less than the corona breakdown potential of the probe. This potential depends on the geometrical configuration of the probe, and is usually in the order of several kilovolts. Therefore, the probe would be insensitive to electrostatic potentials less than its corona potential, rendering it unsatisfactory for use with present day helicopters.

SUMMARY OF THE INVENTION

In this invention, a fixed sensing probe is used to sense the electrostatic charge on aircraft and has connected thereto a high voltage sensor power supply to cause current to flow in the sensing probe. The average magnitude and direction of current flow in the sensing probe is a function of the polarity and magnitude of the electrostatic charge existing on the aircraft.

Two embodiments of the invention are disclosed. The first embodiment employs a single sensing probe to which is connected an alternating current, high voltage sensor power supply. The second embodiment employs two sensing probes, one connected to a positive high voltage sensor power supply, the other connected to a negative sensor power supply. In both embodiments, the high voltage sensor power supplies are of sufficient magnitude to cause a corona discharge from the probe at a potential positive and/or negative with respect to the aircraft, whereby current will flow in the probe.

In the single probe embodiment of the invention, a sensing probe extends from the aircraft and is connected directly to an alternating current, high voltage sensor power supply. Preferably, the probe is of a type which has a relatively low voltage corona discharge potential, and the sensor power supply is of sufficiently high voltage to cause current to flow in the probe during positive and/or negative half cycles. The average current flowing in the probe is detected by an amplifier, the output of which controls remotely located positive and negative high voltage discharge power supplies. The outputs of the discharge power supplies are probes which extend into the atmosphere and the power supplies are of sufficiently high voltage and current carrying capacity to discharge or to maintain the aircraft at a relatively low electrostatic potential regardless of the aircraft charging rate.

In the two probe embodiment of the invention, one probe is connected to a positive high voltage sensor power supply of sufficient magnitude to cause corona discharge from the probe, at least when the aircraft is at zero potential with respect to ground, and the other probe is connected to a similar high voltage sensor power supply of opposite polarity. The average current flowing through both probes is sensed by a control circuit, the output of which controls the operation of remotely located positive and negative high voltage discharge power supplies.

The invention may also be used to determine the electrostatic charge or potential developed on aircraft using the sensing probe, sensor power supply, and the current sensing circuit, but without utilizing the high voltage discharge power supplies.

Accordingly, it is an object of this invention to provide an improved, fixed electrostatic sensing system for determining the electrostatic charge buildup on aircraft; to provide an electrostatic sensing device including a sensing probe having a discharge end of relatively low corona threshold potential spaced from an aircraft, a sensor power supply connected to the probe of sufficiently high voltage to cause a corona discharge from the probe, and a current sensing circuit connected to the probe and having an output which controls remotely located positive and negative high voltage discharge power supplies for discharging the electrostatic buildup on the aircraft; to provide a single probe electrostatic sensing device wherein the probe has a relatively low corona threshold potential, an alternating current high voltage sensor power supply connected to the probe for causing current to flow through the probe during positive and/or negative half cycles, and circuit sensing means connected to the probe and responsive to the direction and magnitude of the average current flow in the probe to control remotely located positive and negative high voltage discharge power supplies; and to provide a two probe electrostatic sensing device wherein one probe is connected to a positive high voltage sensor power supply and the other probe is connected to a negative high voltage sensor power supply, each power supply of sufficient potential to cause current flow from the probes to the atmosphere, at least when the aircraft is at zero potential with respect to ambient, and current sensing means connected to both probes and responsive to the direction and magnitude of the combined probe currents for controlling remotely located positive and negative high voltage discharge power supplies.

DESCRIPTION OF THE PREFERRED EMBODIMENT

Figure 1:
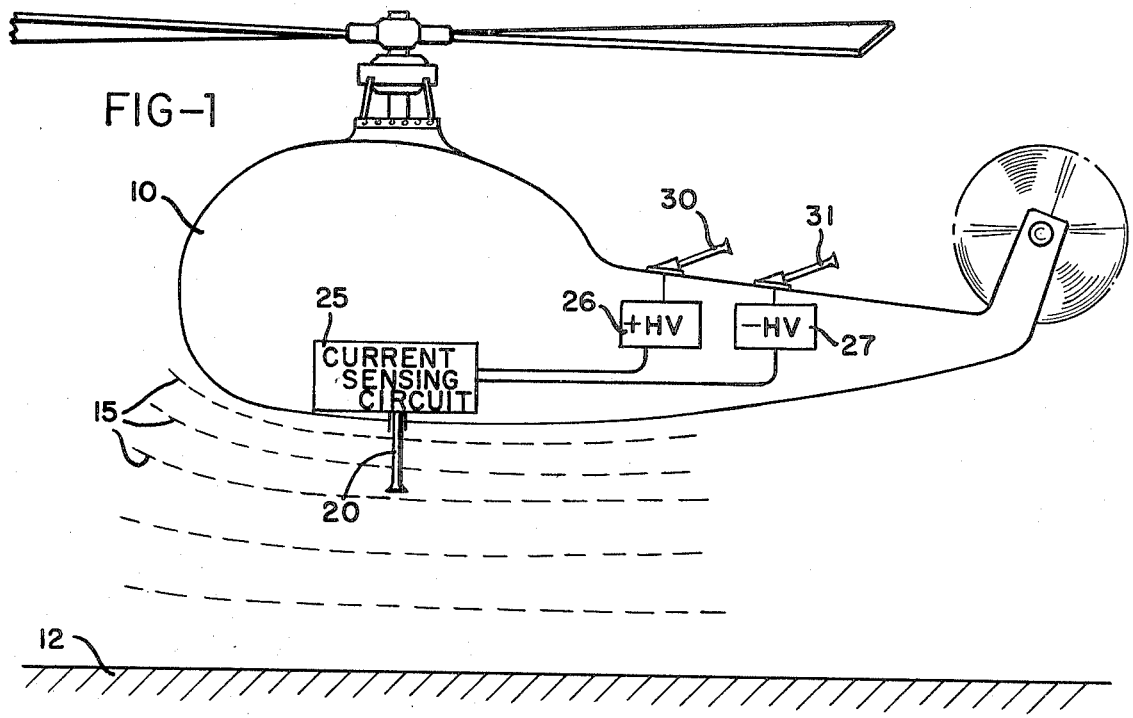
FIG. 1 is a simplified block diagram showing a static discharge system installed on a helicopter.

Referring now to the drawings which show the preferred embodiments of the invention, and particularly to FIG. 1, an aircraft or helicopter 10 is shown hovering above the earth 12. Assuming that the helicopter has accumulated an electrostatic charge, lines of equal potential between the aircraft and the earth are shown by dotted lines 15.

An electrostatic sensing probe 20 extends from the helicopter into the electrostatic field and will sense the magnitude and polarity of the electrostatic charge on the aircraft. The probe is connected to a current sensing circuit 25, the output of which controls positive high voltage discharge power supply 26 and negative high voltage discharge power supply 27, both located in a remote part of the aircraft. The outputs of these discharge power supplies are connected to discharge probes 30 and 31, respectively.

The electrostatic sensor probe 20 extends outwardly from the aircraft 10 and is preferably a static discharge probe of conventional design having a low corona threshold potential, and may include the discharge probes shown in U.S. Pat. Nos. 3,034,020; 3,617,805, or equivalent. The lower the corona threshold potential of the probe, the more sensitive will be the probe to low potential electrostatic charges.

Figure 4:
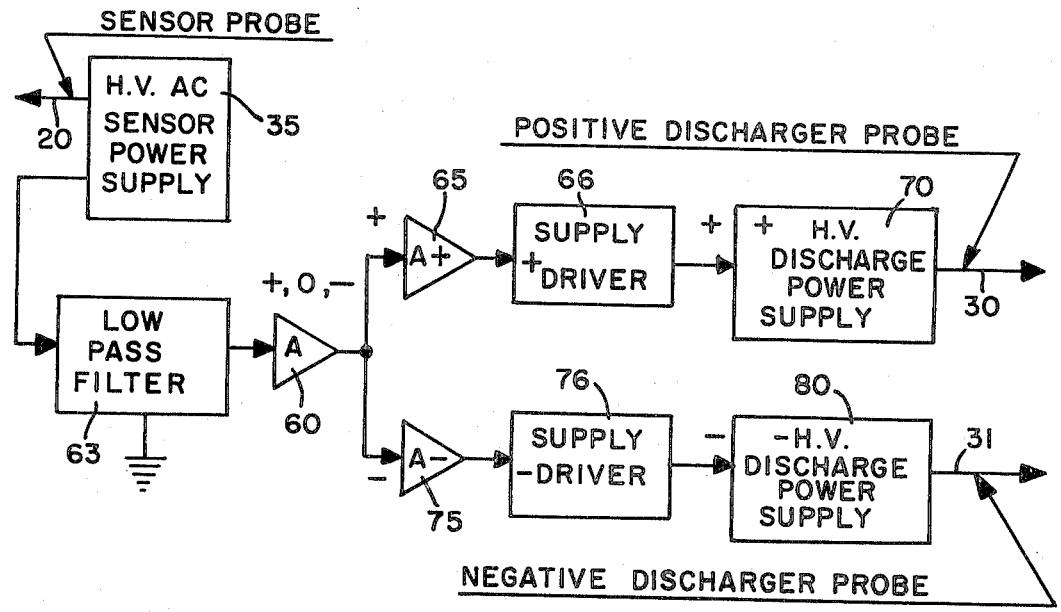
FIG. 4 is a block diagram showing a single probe electrostatic field sensor connected to a control circuit for positive and negative high voltage discharge power supplies.

Referring now to FIG. 4, the probe 20 is connected to an alternating current high voltage sensor power supply 35 which, in the preferred embodiment of the invention, has a peak voltage output of approximately 6 kilovolts. The peak voltage output of the power supply is substantially greater than the corona threshold potential of the particular sensing probe 20 employed. Assuming the sensing probe has a corona threshold potential of ±1 kilovolt, no current will flow in the probe until this corona potential has been obtained, either through the voltage induced in the probe by the power supply, or by an accumulated charge on the aircraft.

Figure 2:
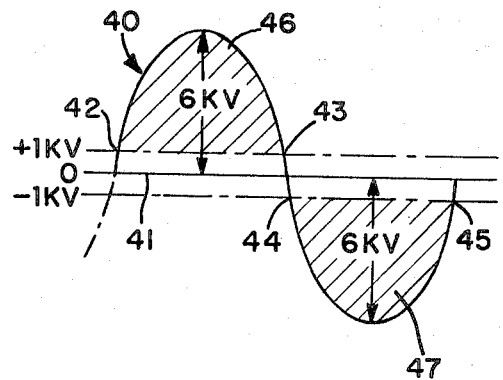
FIG. 2 is a waveform diagram of the voltage on the sensing probe when the aircraft is at zero potential.

FIG. 2 is a waveform diagram showing the voltage on the probe where the aircraft is at zero potential with respect to the surrounding atmosphere. The voltage on the probe is represented by the waveform 40 and varies ±6 kilovolts with respect to the body of the aircraft, as represented by line 41.

The sensing probe 20 is assumed to have a corona threshold potential of approximately ±1 kilovolt, and no current will flow in the probe until this corona threshold potential, with respect to the surrounding atmosphere, has been obtained. Therefore, no current will flow in the probe until the voltage increases to +1000 volts, as shown at point 42, and thereafter current will flow until the voltage again decreases below +1000 volts, as shown at point 43. Similarly, in the negative half cycle, current will again begin to flow at point 44 where the negative voltage exceeds −1000 volts, and will continue to flow until it decreases below −1000 volts at point 45.

The area 46 bounded by points 42 and 43 under the positive half cycle of the curve will be equal, in this example, to the area 47 bounded by points 44 and 45 under the negative half cycle of the curve. Thus, since the areas 46 and 47 are equal, the average current flow in the probe in any one complete cycle is zero.

Figure 3:
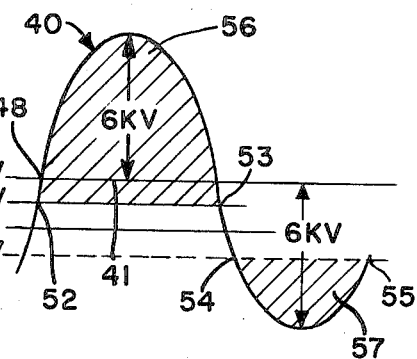
FIG. 3 is a waveform diagram of the voltage on the sensing probe when the aircraft has an accumulated electrostatic charge of 2,000 volts.

FIG. 3 is a waveform diagram showing the voltage on the probe where the aircraft has accumulated an electrostatic charge of +2000 volts with respect to the surrounding atmosphere. Again, the voltage 40 on the probe is assumed to vary with respect to the aircraft structure 41 by ±6 kilovolts.

Since the aircraft has a potential in excess of the corona threshold potential of the sensing probe, current will flow from the probe to the atmosphere even though the voltage on the probe with respect to the aircraft is at zero potential, as at point 48. Current will flow through the probe as long as the probe potential is greater than 1000 volts with respect to the surrounding atmosphere, as shown by the shaded areas in FIG. 3; this is between points 52 and 53 and between points 54 and 55.

The area 56 bounded by points 52 and 53 under the positive half cycle of the curve will be greater, in this example, than the area 57 bounded by points 54 and 55 under the negative half cycle of the curve. Thus, since the area 56 is greater than the area 57, the net current flow in the probe will be positive. As will be explained in more detail later, this will cause the positive high voltage discharge power supply to be activated to reduce the net positive electrostatic charge on the aircraft.

Referring again to FIG. 4, the sensing probe 20 is connected to a sensing circuit 60 through a low pass filter 63. The low pass filter is designed to eliminate any alternating current components and to insure that the input to the current sensing means 60 represents only the average current flow in the probe.

The input to the current sensing means 60 may be positive, negative or zero. Consequently, the output of the amplifier 60 will be positive, negative or zero, and this output will represent the magnitude and polarity of the charge existing on the aircraft if the high voltage discharge power supplies are not utilized. In this case, the output of the amplifier 60 may be fed through resistor R12 to a ±50 μA meter which will provide a direct reading of aircraft potential.

The output of amplifier 60 is also connected to circuits for controlling the positive and negative discharge power supply means for neutralizing the accumulated electrostatic charge. If the output of amplifier 60 is positive, then a positive output will be applied to control circuit or amplifier 65, the output of which is connected to supply driver 66 and remotely located positive high voltage discharge power supply 70. The output of positive high voltage discharge power supply is connected to a discharger probe 30, and therefore when the aircraft obtains a positive charge, the positive high voltage discharge power supply will be activated to discharge the aircraft.

If the output of current sensing means 60 is negative, this signal will be applied to amplifier 75, the output of which is connected to a supply driver 76 and remotely located negative high voltage discharge power supply 80. The negative discharge power supply is connected to a discharge probe 31.

Figure 6:
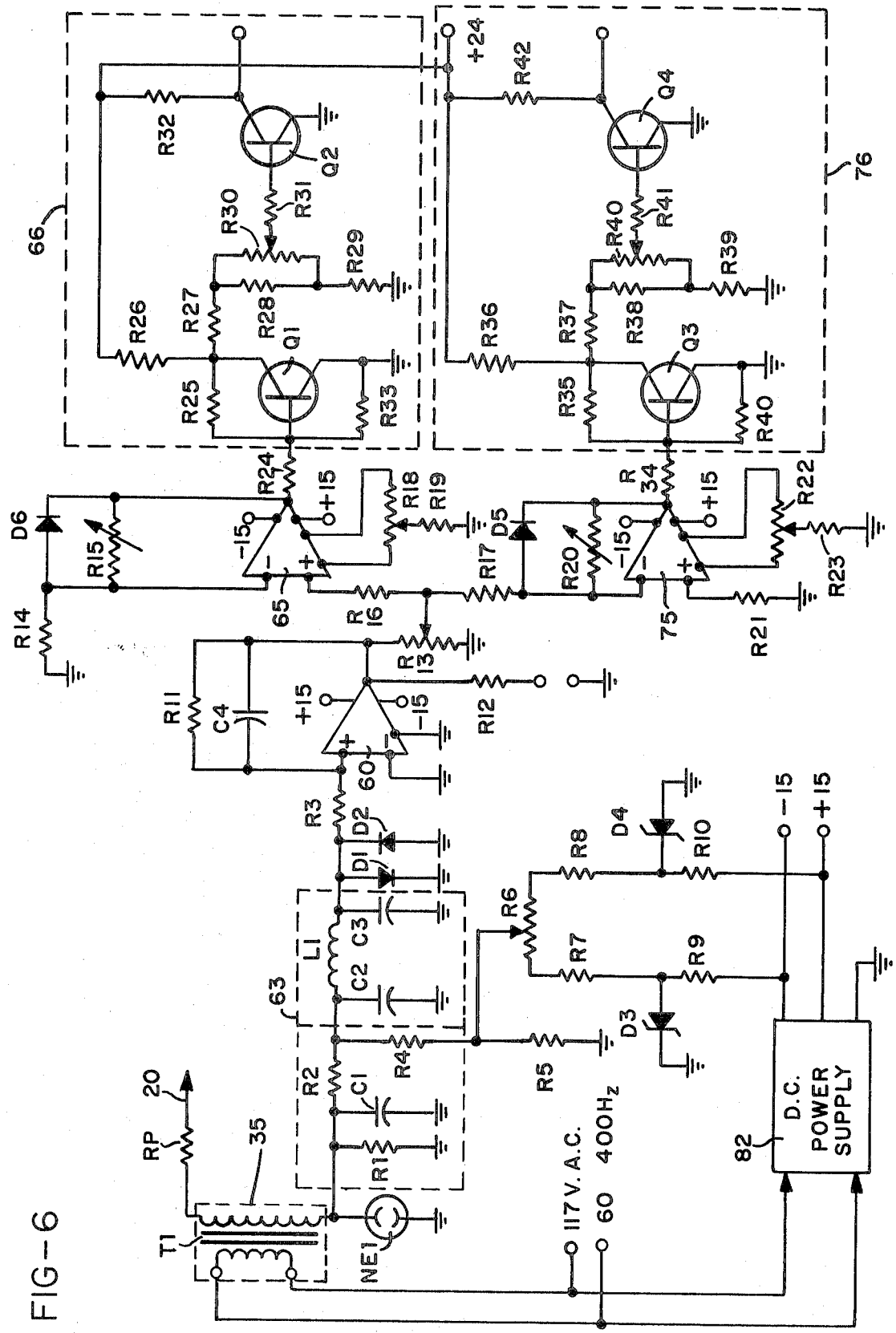
FIG. 6 is an electrical schematic diagram of the circuit shown in block diagram form in FIG. 4, excluding the remotely mounted high voltage discharge power supplies.

Referring now to FIG. 6 which is a complete electrical schematic diagram of the control circuit described in FIG. 4, the sensing probe 20 is shown as having a resistance $R_p$. The probe is connected to a high voltage alternating current sensor power supply 35 which includes a transformer T1, the primary winding of which is connected to 117 volts AC.

The secondary winding of the transformer T1 is connected at one end to the probe 20 and at the other end to ground through resistor R1 and capacitor C1. A neon lamp NE1 is included to protect the low pass filter 63 in the event that circuit components in the filter open and cause a high voltage condition to exist at the cold end of the transformer secondary winding. Should this condition occur, the neon lamp would ignite and short the high voltage to ground.

The low pass filter 63 includes capacitor C1, which acts as an AC ground, capacitors C2 and C3, inductor L1, and resistors R1 and R2.

From the low pass filter 63, current flows to the sensing means 60 through resistor R3. Diodes D1 and D2 are connected in antiparallel relation and serve as a protective circuit for the input to the current sensing means or amplifier 60. These diodes have a forward resistance of approximately 650 ohms at low voltage levels.

In the preferred embodiment, the current sensing means 60 is a Teledine type 1703 amplifier connected as an operational amplifier, although it is understood that other similar devices could be used. The input to the amplifier 60 senses the average voltage developed across diodes D1 and D2 which is proportional to the average current flowing in the probe 20 shifted in value according to the electrostatic charge on the aircraft.

The voltage at the input of the filter 63 may be adjusted through a network including resistors R4–R10 and Zener diodes D3 and D4. The resistors are connected to an output of low voltage direct current power supply 82 and form a voltage dividing network. The voltage at the center tap of potentiometer R6 is adjusted to cause the output of the amplifier 60 to be zero volts when the electrostatic charge or voltage on the aircraft is zero volts. In the embodiment shown, the voltage of the adjustable arm of potentiometer R6 can vary by approximately ±1 volt.

Resistor R11 and capacitor C4 act in a feedback circuit to the amplifier 60. The amplifier 60 amplifies the signal on its input, and its output will vary from 0 to approximately +5 volts for positive electrostatic charges on the helicopter, and from 0 to approximately −5 volts for negative electrostatic charges on the helicopter.

The output of amplifier 60 is applied to potentiometer R13 which is adjusted to set the overall gain of the system. The adjustable arm of this potentiometer is connected to amplifiers 65 and 75, both of which are integrated circuit amplifiers. Both amplifier 65 and 75 have essentially unity gain, and amplifier 75 acts as an inverter. The gain of these amplifiers may be adjusted by feedback potentiometers R15 and R20. The zero level output of these amplifiers is adjusted by potentiometers R18 and R22.

The output of amplifier 65 is applied to a driver circuit 66 including transistors Q1 and Q2 while the output of amplifier 75 is applied to a driver circuit 76 including transistors Q3 and Q4. The output of transistor Q2 controls the output of the positive high voltage discharge power supply while the output of transistor Q4 controls the output of negative high voltage discharge power supply. Both of these driver circuits have an output voltage which may vary from zero to approximately 5VDC, depending on the magnitude of the electrostatic charge of the aircraft.

The values and type designations for the components in FIG. 6 are given in Table I.

TABLE I

| RESISTORS (in ohms) | | CAPACITORS (in $\mu f$) | |
|---|---|---|---|
| R1 | 1K | C1 | 1.0 |
| R2 | 15K | C2, C3 | 5 |
| R3 | 1K | C4 | .0047 |
| R4 | 1M | | |
| R5 | 220 | | |
| R6 | 10K | DIODES | |
| R7, R8 | 4.7K | D1, D2 | 1N4005 |
| R9, R10 | 1.3K | D3, D4 | IN3681 (Zener) |
| R11 | 66M | D5, D6 | IN916 |
| R12 | 200K | | |
| R13 | 10K | | |
| R14, R21 | 1.1K | | |
| R15, R20 | 10K | TRANSISTORS | |
| R16, R17 | 1.0K | Q1, Q2, Q3, Q4 | MPS6531 |
| R18, R22 | 10K | | |
| R19 | R23 | 9.1K | |
| R24, R34 | 68K | | |
| R25, R35 | 68K | INTEGRATED CIRCUITS | |
| R26, R36 | 10K | 60 | Teledine 1703 |
| R27, R37 | 8.2K | 65, 75 | SN5241 |
| R28, R38 | 1.5K | | |
| R29, R39 | 1.6K | | |
| R30, R40 | 10K | | |
| R31, R41 | 10K | | |
| R32, R42 | 2.7K | | |
| Rp | 20M | | |

Figure 5:
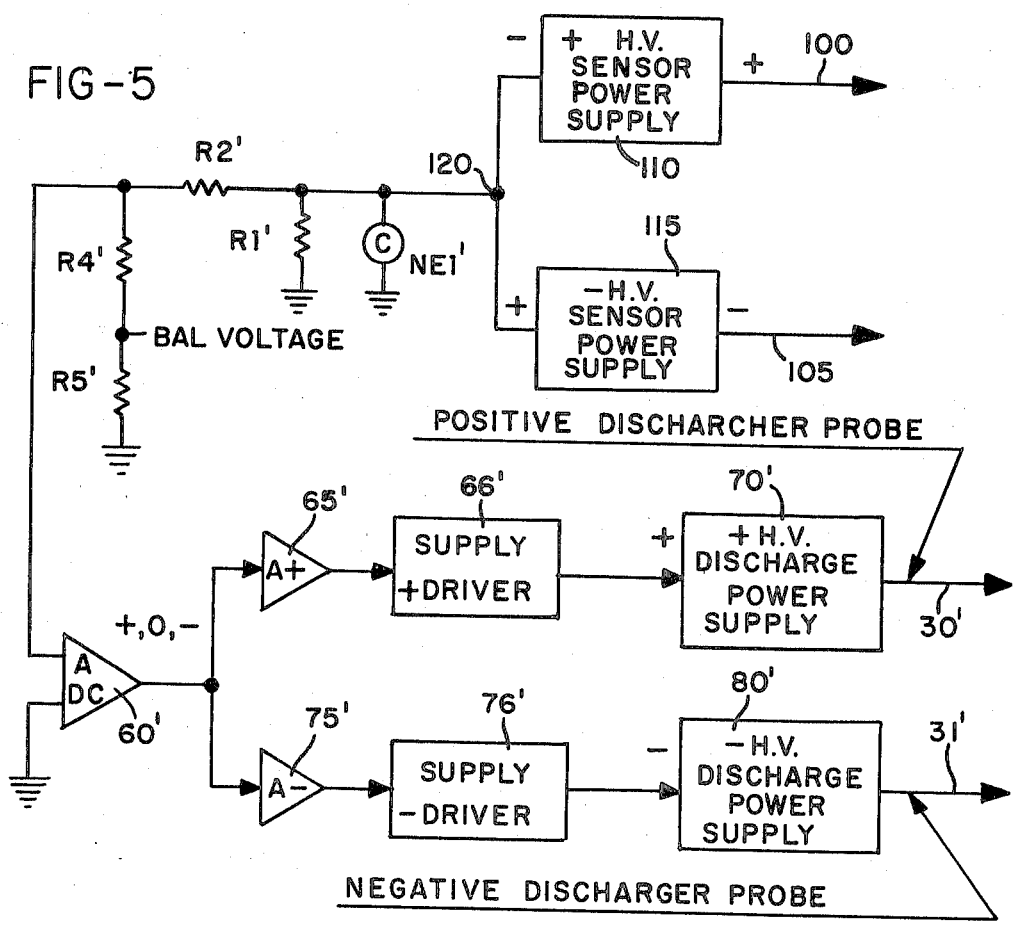
FIG. 5 is a block diagram of a two probe sensor connected to a control circuit for positive and negative high voltage discharge power supplies.

Referring now to FIG. 5, another embodiment of the invention is disclosed wherein two sensing probes 100 and 105 are used, one connected to a positive high voltage sensor power supply 110, the other connected to a negative high voltage sensor power supply 115. Both sensor power supplies have a high voltage output of sufficient magnitude to cause corona discharge from the probes, at least when the aircraft is at zero potential. The ground side of both of these sensor power supplies are combined at 120 and the net current flowing in the probes is detected by a current sensing circuit 60'. As the helicopter potential changes due to charging of the helicopter, there will be a net current flow of one direction or the other through resistor R1'. This will be detected by the sensing means 60' which will control the remotely located high voltage discharge power supplies 70' and 80' in the manner previously described.

While the forms of apparatus herein described constitute preferred embodiments of the invention, it is to

What is claimed is:

1. Apparatus for discharging an electrostatic charge accumulated on a body, said apparatus including
   a probe extending from said body into the atmosphere,
   a high voltage sensor power supply connected between said probe and said body, said sensor power supply having an output voltage of sufficient magnitude to cause current to flow through said probe to the atmosphere,
   sensing means for sensing the magnitude and polarity of said current flow in said probe as an indication of an electrostatic charge on said body,
   separate electrostatic discharge means, and
   means responsive to said sensing means for controlling the operation of said electrostatic discharge means to neutralize the electrostatic charge.

2. The apparatus of claim 1 wherein said electrostatic discharge means is a high voltage power supply connected between said body and at least one discharge probe extending into the atmosphere.

3. Apparatus for discharging an electrostatic charge accumulated on said body, said apparatus including
   a probe extending from said body to the atmosphere,
   an alternating current, high voltage sensor power supply connected to said probe for causing current to flow through said probe during positive and/or negative half cycles of power supply output,
   current sensing means connected to sense the average current flow in said probe for providing an output which is a function of the direction and magnitude of said current flow,
   positive and negative electrostatic discharge means, and
   means responsive to the output of said current sensing means for controlling the output of said positive and negative discharge means for neutralizing said accumulated electrostatic charge.

4. The apparatus of claim 3 further including a low pass filter electrically connected between said high voltage sensor power supply and said current sensing means whereby only the average direct current flowing in said probe will be sensed by said current sensing means.

5. The apparatus of claim 3 wherein said positive and negative electrostatic discharge means includes positive and negative high voltage power supplies, each power supply connected between the body and at least one discharge probe extending into the atmosphere.

6. Apparatus for discharging an electrostatic charge accumulated on a body including
   first and second probes extending from said body into the atmosphere,
   a positive high voltage sensor power supply connected between said first probe and said body,
   a negative high voltage sensor power supply connected between said second probe and said body, both said positive and said negative high voltage sensor power supplies providing a voltage to the end of the probe in excess of the corona potential of said probe at least when the accumulated electrostatic charge on said body is near zero,
   means for sensing the direction and magnitude of the combined current flow in said first and second probes for providing an output proportional thereto,
   positive and negative electrostatic discharge means, and
   means responsive to the output of said current sensing means for controlling said positive and negative electrostatic discharge means for neutralizing said accumulated electrostatic charge.

7. The apparatus of claim 6 wherein said positive and negative electrostatic discharge means includes positive and negative high voltage power suppies, each power supply connected between the body and at least one discharge probe extending into the atmosphere.

* * * * *